United States Patent
Field et al.

(10) Patent No.: US 9,796,359 B2
(45) Date of Patent: Oct. 24, 2017

(54) METHOD AND APPARATUS FOR REMOVING AND PREVENTING LENS SURFACE CONTAMINATION ON A VEHICLE LENS

(75) Inventors: Michael Field, Lansing, NY (US); Paul P. McCabe, Binghamton, NY (US)

(73) Assignee: THE RAYMOND CORPORATION, Greene, NY (US)

( * ) Notice: Subject to any disclaimer, the term of this patent is extended or adjusted under 35 U.S.C. 154(b) by 956 days.

(21) Appl. No.: 13/403,884

(22) Filed: Feb. 23, 2012

(65) Prior Publication Data

US 2013/0219742 A1 Aug. 29, 2013

(51) Int. Cl.
*B60S 1/54* (2006.01)
*B60S 1/56* (2006.01)
*B60S 1/08* (2006.01)
*G02B 27/00* (2006.01)

(52) U.S. Cl.
CPC .......... *B60S 1/0848* (2013.01); *B60S 1/54* (2013.01); *G02B 27/0006* (2013.01); *B60S 1/56* (2013.01)

(58) Field of Classification Search
CPC . B60S 1/0848; B60S 1/54; B60S 1/56; G02B 27/0006; F26B 21/08; F26B 21/10
USPC ................. 701/1; 34/546, 483, 467
See application file for complete search history.

(56) References Cited

U.S. PATENT DOCUMENTS

| | | | |
|---|---|---|---|
| 5,378,493 A | 1/1995 | Zivkovic | |
| 5,429,502 A | 7/1995 | Cooper et al. | |
| 6,170,955 B1 * | 1/2001 | Campbell et al. | 359/509 |
| 7,440,025 B2 | 10/2008 | Cheng | |
| 7,965,336 B2 | 6/2011 | Bingle et al. | |
| 2006/0289458 A1 | 12/2006 | Kim et al. | |
| 2007/0112476 A1 * | 5/2007 | Obradovich | 701/1 |
| 2009/0260795 A1 * | 10/2009 | Perazzo | 165/269 |
| 2010/0163220 A1 * | 7/2010 | Nakajima | 165/202 |
| 2011/0010041 A1 * | 1/2011 | Wagner et al. | 701/29 |

FOREIGN PATENT DOCUMENTS

| | | |
|---|---|---|
| DE | 19942286 C1 | 8/2000 |
| DE | 10150078 A1 | 12/2002 |
| DE | 102005021708 A1 | 11/2006 |
| DE | 102009008275 A1 | 8/2010 |
| JP | 2001091807 A | 4/2001 |
| JP | 2011066560 A | 3/2011 |
| JP | 2011109578 A | 6/2011 |

OTHER PUBLICATIONS

European Patent Office, Extended European Search Report, Application No. 13156387.6, Jun. 25, 2013, 6 pages.

* cited by examiner

*Primary Examiner* — Jessica Yuen
(74) *Attorney, Agent, or Firm* — Quarles & Brady LLP

(57) ABSTRACT

A vehicle includes a vehicle frame and an optical device mounted on the vehicle frame. A first temperature sensor senses ambient air temperature surrounding the vehicle frame, a second temperature sensor senses a temperature of a lens of the optical device, and a humidity sensor senses moisture content of air proximal to the lens. An exhaust directs gas at the lens in response to the sensed ambient air temperature, the sensed lens temperature, and the sensed moisture content.

20 Claims, 3 Drawing Sheets

METHOD AND APPARATUS FOR REMOVING AND PREVENTING LENS SURFACE CONTAMINATION ON A VEHICLE LENS

CROSS REFERENCES TO RELATED APPLICATIONS

Not Applicable

STATEMENT REGARDING FEDERALLY SPONSORED RESEARCH

Not Applicable.

BACKGROUND OF INVENTION

Optical devices are being incorporated into material handling industrial vehicles such as automatic guided vehicles (AGVs), operate to assist keeping the vehicles on a prescribed path. Likewise, loads picked up by material handling vehicles can be identified using optical devices to ensure the correct load is being picked up and moved by the vehicle.

Such optical devices, such as optical guidance systems are often subjected to varying atmospheric and air quality conditions. Lenses forming part of the optical devices can be obstructed or rendered inoperative due to an accumulation of condensation and dust as a result of operating under such conditions. For example, an optical guidance system mounted on an AGV uses a beam of directed light to reflect back from specific known reflectors to determine the vehicle position relative to the reflectors. Likewise, a bar code scanner mounted on a vehicle uses light to read a bar code on a load on board the vehicle or prior to picking up the load to ensure the desired load is about to be transported. An accumulation of dust, dirt, or condensation on the lens of the optical device will reduce the distance that the reflectors can be detected or cause a code to be misread. In environments where condensation is prevalent due to the vehicle moving in and out of varying temperature and humidity zones, optical devices either cannot be used or are significantly reduced in function.

Conventionally, optical device lenses are either cleaned on a scheduled basis, or only when it becomes non-functional. Neither of these solutions provide an efficient and cost-effective method for operation of material handling vehicles. For example, during a scheduled cleaning time or when the equipment becomes non-functional, the vehicle must be taken out of operation until the lenses are cleaned. In addition to the cost of the cleaning procedure, the downtime required for the cleaning procedure results in a drop in vehicle productivity. Therefore, a need exists for a system to prevent dust and dirt particles from accumulating on the lenses of scanners and vision equipment without requiring vehicle downtime. A need also exists for a system to allow efficient use of scanners and vision equipment on vehicles moving in and out of varying temperature and humidity zones.

SUMMARY OF THE INVENTION

The present invention provides a vehicle including a vehicle frame and an optical device mounted on the vehicle frame. The vehicle also includes a first temperature sensor sensing ambient air temperature surrounding the vehicle frame, a second temperature sensor sensing a temperature of a lens of the optical device, and a humidity sensor sensing moisture content of air proximal to the lens. The vehicle further includes an exhaust directing gas at the lens in response to the sensed ambient air temperature, the sensed lens temperature, and the sensed moisture content.

A general objective of the present invention is to remove and prevent surface moisture contamination from a lens of an optical device mounted on a frame of a vehicle. This objective is accomplished by sensing ambient air temperature and moisture content proximal to the lens, sensing the temperature of the lens, and directing moisture contamination removal gas through an air exhaust at the lens in response to the sensed temperatures and moisture content.

The foregoing and other objects and advantages of the invention will appear from the following detailed description. In the description, reference is made to the accompanying drawings which illustrate a preferred embodiment of the invention.

DETAILED DESCRIPTION OF THE INVENTION

Figure 1:
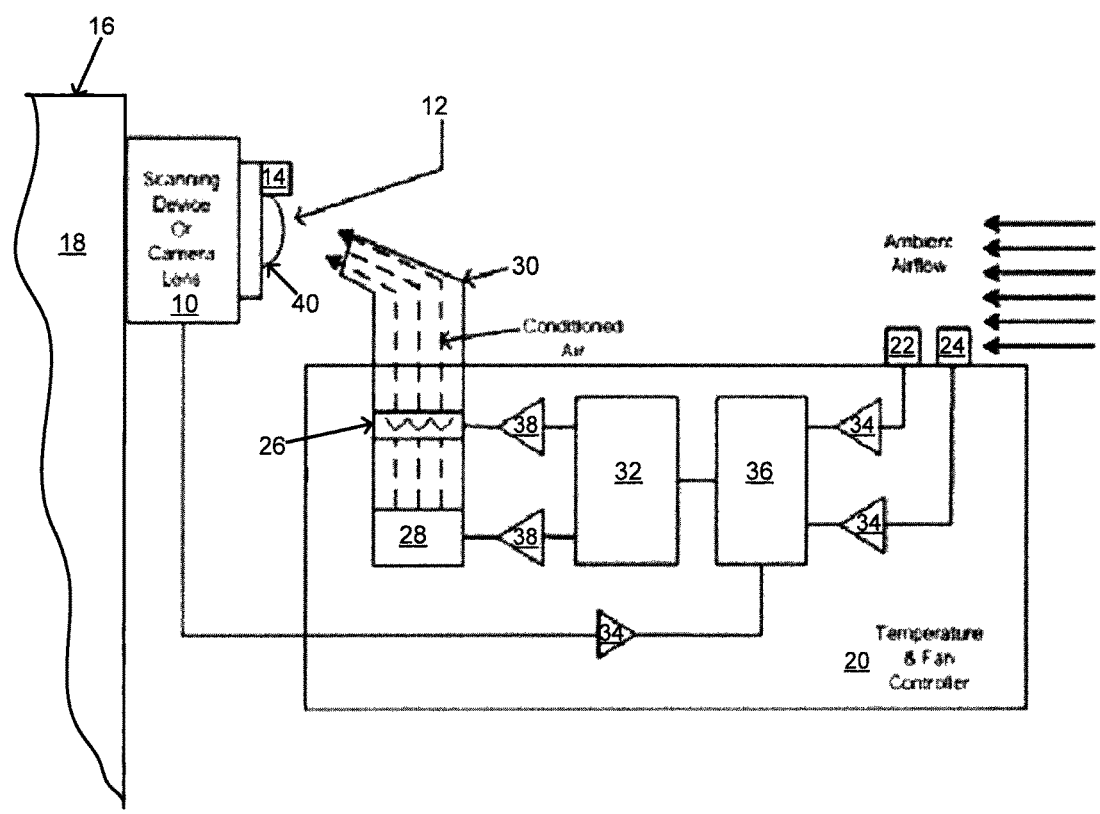
FIG. 1 is a schematic view of an optical device and a lens cleaner in accordance with the present invention.

Referring to FIG. 1, an optical device 10 including a lens 12 is mounted on a frame 16 of a vehicle 18. The lens 12 of the optical device 10, such as a scanner or camera, is cleaned by a lens cleaner 20 including a lens temperature sensor 14, an ambient temperature sensor 22, a humidity sensor 24, a heater 26, a blower 28, an air exhaust 30, and a microcontroller or processor 32. The vehicle 18, such as an AGV or other industrial vehicle, may operate in environments including moisture, dust, or other airborne particles that can cause buildup on the lens 12. The lens cleaner 20 operates to prevent condensation, dust, or other particles from accumulating on the lens 12 so that the optical device 10 can obtain an unobstructed view through the lens 12 for image capture and/or scanning. More specifically, the lens cleaner 20 can continuously or periodically monitor temperature and/or humidity near the lens 12 and provide a stream of conditioned air directed toward the lens 12 to clear current and potential buildup. As a result, the lens cleaner 20 can provide improved vehicle availability and operating costs by requiring fewer inspections and service intervals.

The lens temperature sensor 14 can be a thermocouple or other temperature sensing device known in the art mounted proximal the lens 12 sensing the actual temperature of a portion of the lens, such as an exterior surface of the lens 12. Alternatively, a lens temperature sensor sensing an air temperature proximal the lens 12 can be used without departing from the scope of the invention.

The ambient temperature sensor 22 is located remote from the lens temperature sensor 14 to sense temperature of air surrounding the vehicle 18. Preferably, the ambient temperature sensor 22 is mounted to the vehicle 18 away from any heat source on the vehicle 18 that could influence the temperature sensed by the ambient temperature sensor 22. As in the lens temperature sensor 14, the ambient temperature sensor 22 can be a thermocouple or other temperature sensing device known in the art The humidity sensor 24, such as an electronic hygrometer, senses the moisture content of air proximal the lens 12. Preferably, the humidity sensor 24 is mounted adjacent the lens 12, i.e. within a one foot of the lens 12, to provide an accurate measurement of moisture content proximal the lens 12. However, moisture content of air proximal the lens 12 can be sensed by a humidity sensor 24 mounted anywhere on the vehicle 18 without departing from the scope of the invention.

The blower 28 is preferably an axial or centrifugal fan mounted on the vehicle 18 that exhausts air through the air exhaust 30 directing the air toward the lens 12. Air in the context of the present invention can be any gas, such as engine or compressor exhaust, nitrogen, and the like, suitable for blowing over the lens 12 to remove contaminants. As a result, the blower 28 can be any source of pressurized gas, such as an internal combustion engine, compressor, a container containing a pressurized gas, and the like, that supplies a gas that flows through the air exhaust 30 toward the lens 12 without departing from the scope of the invention.

The heater 26 heats the air exhausting through the air exhaust 30. The heater 26 can be any component on the vehicle 18 generating heat that can be transferred to the air exhausting through the air exhaust 30. Preferably, the heater 26 is an electrical resistive heater disposed in the flow path of the air prior to exhausting through the air exhaust.

The microcontroller 32 can receive and analyze signals from the lens temperature sensor 14, the ambient temperature sensor 22, and the humidity sensor 24 (e.g., through signal amplifiers 34 and one or more analog to digital converters 36), and can transmit control signals to the heater 26 and the blower 28 (e.g., through signal amplifiers 38). Based on the signals received from the lens temperature sensor 14, the ambient temperature sensor 22, and the humidity sensor 24, the microcontroller 32 can determine the relative need for air movement and/or conditioning across the lens 12. The microcontroller 32 can then control the blower 28 to urge a constant or periodic stream of air through the air exhaust 30 and across an exterior surface 40 of the lens 12. The microcontroller 32 can also control the heater 26 to heat and lower the moisture content of the air urged through the air exhaust 30 by the blower 28 in order to prevent moisture contamination on the lens surface 40.

Figure 2:
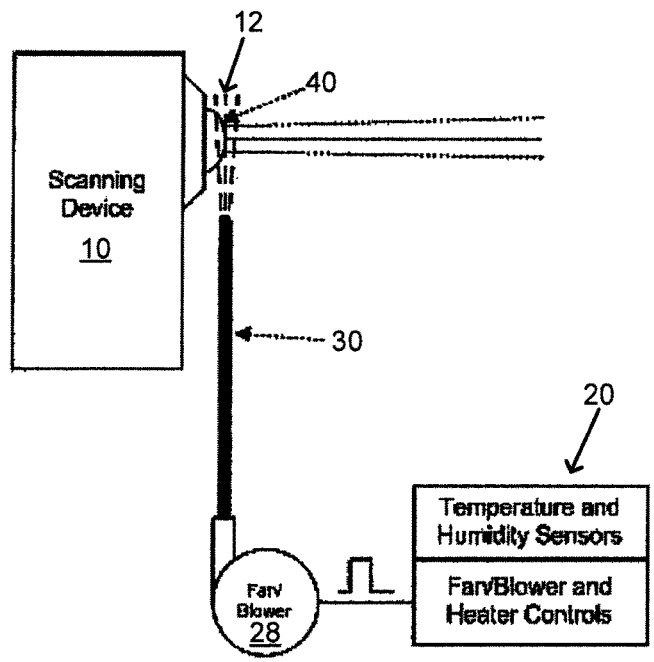
FIG. 2 is an alternate embodiment of the lens cleaner of FIG. 1.
Figure 3:
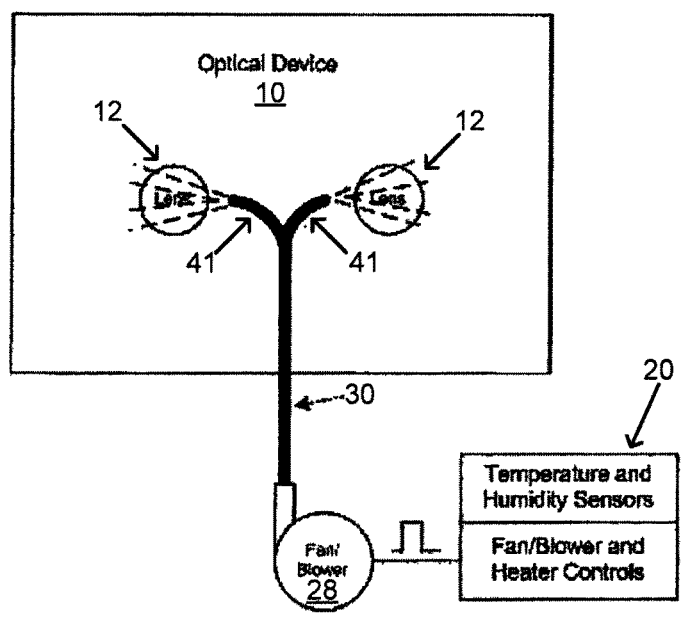
FIG. 3 is another alternate embodiment of the lens cleaner of FIG. 1.

The air exhaust 30 can be positioned adjacent to the lens 12 in order to force air across the lens 12. In some embodiments, the air exhaust 30 can be a shaped plenum, as shown in FIG. 1, in order to help direct the air forced through the air exhaust 30 toward the lens 12. In other embodiments, the air exhaust 30 can be a hose or tubing, as shown in FIG. 2. In addition, if the optical device 10 includes more than one lens 12, as shown in FIG. 3, the air exhaust 30 can include multiple branches 41 to direct air toward each lens 12.

The controller 20 can perform one or more operations in order to properly clean and maintain the lens 12. For example, a plurality of processes can be saved within the microcontroller 32, and one or more of the processes can be executed by the microcontroller 32 in order to carry out such operations. The processes can be executed, or can be permitted to be executed, based on pre-programming, user input, and/or sensed input. The following paragraphs describe example operations of the lens cleaner 20 according to some embodiments of the invention.

In a first example operation, the blower 28 is a fan that can provide a steady air flow across the lens 12. The steady airflow can prevent the accumulation of dust particles on the lens 12, thus reducing or eliminating the need for frequent cleaning procedures in a dusty environment. In one embodiment, the blower 28 is operated at a constant speed in order to achieve a constant air flow at all times. For example, a constant air flow speed can be preprogrammed to accommodate a specific kind of dust particle found in the operation location of the vehicle 18. In another embodiment, the blower 28 is a fan that can be operated at different speeds, where each speed causes a different amount of airflow urged through the air exhaust. For example, the lens cleaner 20 can include a sensor (not shown) in communication with the microcontroller 32 that can detect or measure the amount of returned light through the lens 12 for a given set of conditions. The microcontroller 32 can then operate the blower 28 at higher or lower speeds based on the sensed light levels to maintain visibility through the lens 12 despite more or less airborne particles in the surrounding environment.

In another example operation, airflow from the blower 28 can be emitted in a pulsed manner to the lens 12. In comparison to a steady airflow, pulsed airflow can help maintain the amount of light returned through the lens 12 in environments with greater amounts of airborne contamination or in environments with particles that are heavier or more moist than simple dust. For example, if a constant stream of air is applied to the lens 12, any particles within that flow will have momentum as shown in the expression:

$$M=(m*V^2)/2$$

Where M is the Momentum, m is the particle mass, and V is the particle velocity.

The flow of the stream of air will also exert a force on each particle to "push" it along with a force F that is also dependent on the velocity and mass of the stream of air. The combination of the force exerted by the stream of air and the particle's own momentum will tend to keep the particle in motion and not come to rest on the lens surface 40.

In the case where the air flow has stopped (e.g., the vehicle 18 is not in operation and the blower 28 is off), dust particles may begin to accumulate on the lens surface 40 due to normal air movement around the vehicle 18. Once on the lens surface 40, the particles may tend to stick to the lens surface 40 due to van der Waals interactions, static electricity, or the particles may have some adhesive properties. In such cases, a steady stream of air may not exert enough force to resuspend the particles back into the stream of air. However, the force exerted by pulsed air flow can provide a jackhammer effect in order to dislodge the particles from the lens surface 40. More specifically, as the stream of air is being blown across the lens surface 40, the force exerted on the dust particle will increase. The force, F, that is exerted on the particle is shown as F=m*a; where F is the force, m is the fluid mass, and a is the acceleration.

If the air is pulsed, at a first time t1 the velocity v1 will be zero and at a second time t2 the velocity v2 will be a higher value. The impulse energy imparted to the particle by the air will be affected by the change in air flow velocity and the time interval to go from v1 to v2. If acceleration is the change in velocity with respect to time, then F=m*(dv)/(dt). Thus, for example, if the force F is pulsed and the time interval to go from zero to force F is 0.01 seconds, the instantaneous change in force applied is 100 times greater than simply applying a steady-state force. The average force remains the same but the short term impulse energy on the dust particle can be much higher.

Environments where pulsed airflow may be beneficial can include a facility that processes tire making equipment, where dust can contain small amounts of rubber and soot, or a facility including a food processing area where animals are slaughtered and washed, where dust can include small droplets of water. In order to create the pulsed airflow, the microcontroller 32 can transmit a pulse width modulated control signal to operate the blower 28. In some embodiments, the air stream can be pulsed at specific frequencies and/or pulse amplitudes to get more impulses of energy imparted to the dust or soot particle depending on the type of particle and its adhesion to the lens surface 40.

In some embodiments, if the time of non-operation of the vehicle 18 can be determined or monitored, and if the type of contamination (e.g., dust, soot, condensation, etc.) is known or input by a user, the microcontroller 32 can analyze these conditions and/or other sensed conditions and execute operation of the blower 28 with a combination of variable air speed and pulsing to assist with cleaning the lens 12. In addition, in yet another example operation, the heater 26 can be operated in conjunction with the blower 28. As a result, the microcontroller 32 can execute operation of the blower 28 and the heater 26 with a combination of variable air speed, pulsing, and variable temperature to assist with cleaning the lens 12.

Figure 4:
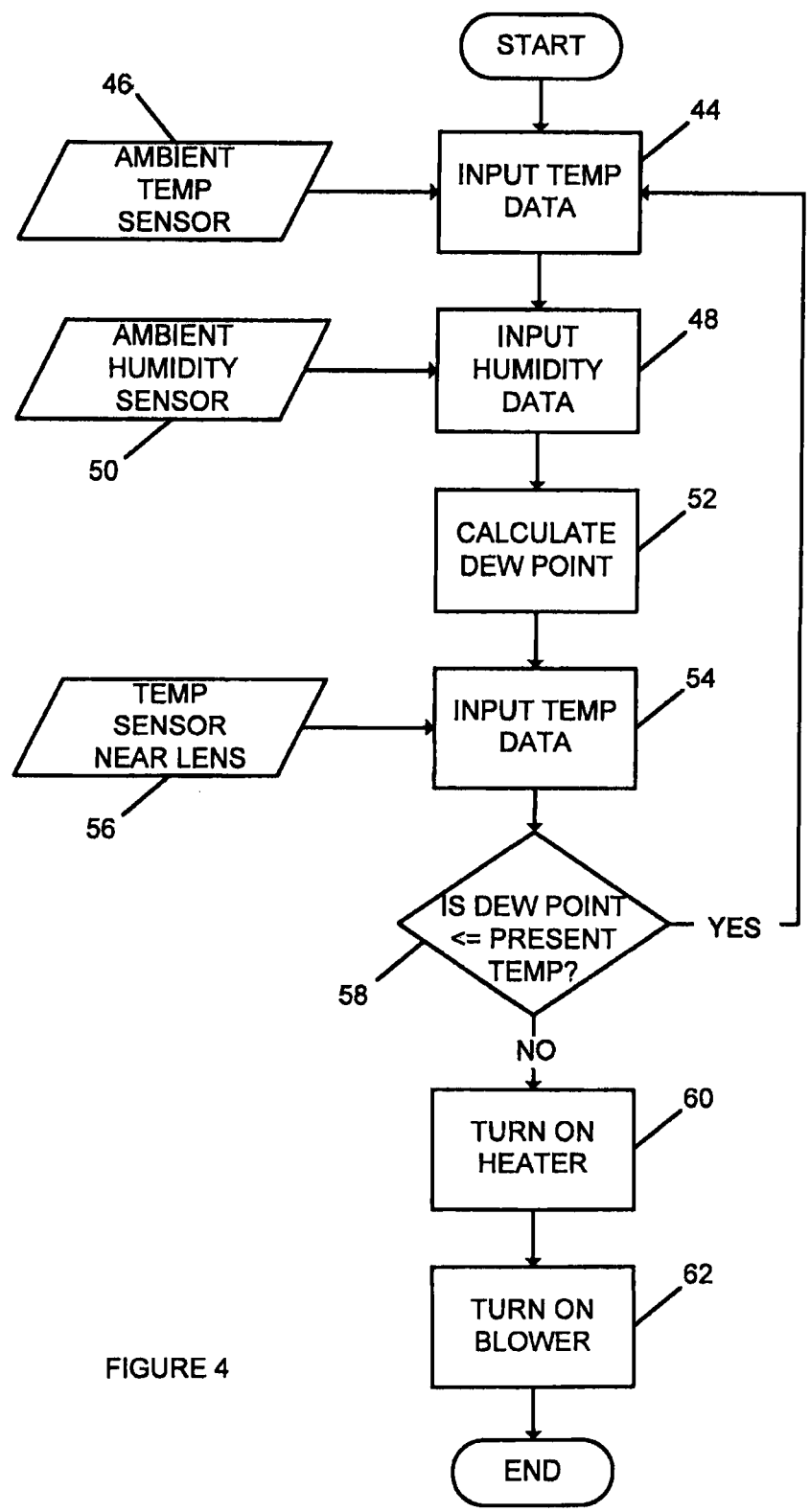
FIG. 4 is a flow chart of an example operation for preventing and removing lens surface contamination of an optical device in accordance with the present invention.

For example, FIG. 4 is a flow chart illustrating a process for operation of both the blower 28 and the heater 26. At step 44, the microcontroller 32 can determine the ambient temperature near the lens 12 or surrounding the vehicle 18, as sensed by the ambient temperature sensor 22, from input data block 46. At step 48, the microcontroller 32 can determine the ambient humidity or moisture content of the air near the lens 12, as sensed by the humidity sensor 24, from input data block 50. At step 52, the microcontroller 32 can calculate a dew point temperature based on the sensed temperature and humidity, for example using one of the following equations:

$$Td_c = T_c - ((100 - RH)/5)$$

Where $Td_c$ is the Celsius dew point temperature, $T_c$ is the Celsius ambient temperature, and RH is the relative humidity.

$$Td_f = T_f - ((100 - RH)/2.778)$$

Where $Td_f$ is the Fahrenheit dew point temperature, $T_f$ is the Fahrenheit ambient temperature, and RH is the relative humidity.

At step 54, the microcontroller 32 can determine the present temperature of the lens 12, as sensed by the lens temperature sensor 14, from input data block 56. At step 58, the microcontroller 32 can compare the dew point temperature with the present temperature of the lens 12. If the dew point temperature is less than the present temperature, the microcontroller 32 can revert back to determining the ambient temperature at step 44. If the dew point temperature is greater than or equal to the present temperature (e.g., indicating conditions that would create condensation on the lens 12), the microcontroller 32 can turn on the heater 26, at step 60, and turn on the blower 28, at step 62. The blower 28 can direct a stream of air across the lens surface 40, and the heater 26 can warm and dehumidify the air directed by the blower 28 in order to lower the moisture content of the directed air below the moisture content sensed by the humidity sensor.

As described above, the blower 28 can be operated constantly or periodically, with either a steady airflow speed, a varying airflow speed, and/or a pulsed airflow, and with or without the heater 26 conditioning the air. Operation of the blower 28 and/or the heater 26 can prevent accumulation of dust particles on the lens surface 40, can clear the lens surface 40 of accumulated dust particles (e.g., built up when the vehicle 18 was off or idle), and can prevent condensation on the lens surface 40 when the vehicle 18 is moved through different environments.

While there has been shown and described what are at present considered the preferred embodiments of the invention, it will be obvious to those skilled in the art that various changes and modifications can be made therein without departing from the scope of the invention defined by the appended claims.

We claim:

1. A vehicle comprising:
a vehicle frame;
an optical device mounted on said frame and including a lens having an exterior surface exposed to ambient air surrounding said vehicle;
a first temperature sensor sensing air temperature of said ambient air surrounding the vehicle;
a second temperature sensor sensing a temperature of said lens;
a humidity sensor sensing moisture content of air proximal said lens; and
an exhaust directing a gas at said lens exterior surface in response to said ambient air temperature sensed by said first temperature sensor, said temperature of said lens sensed by said second temperature sensor, and said moisture content sensed by said humidity sensor.

2. The vehicle as in claim 1, including a heater heating said gas directed by said exhaust.

3. The vehicle as in claim 2, in which said heater heats said gas directed by said exhaust and lowers moisture content in said gas directed by said air exhaust below the moisture content sensed by said humidity sensor.

4. The vehicle as in claim 1, including a blower urging said gas directed by said exhaust out of said exhaust.

5. The vehicle as in claim 4, in which said blower is operable at different speeds, wherein each speed causes a different amount of flow of said gas directed by said exhaust to exit said exhaust at said lens.

6. The vehicle as in claim 1, in which said exhaust directs a steady stream of gas at said lens.

7. The vehicle as in claim 1, in which said exhaust directs pulses of gas at said lens.

8. The vehicle as in claim 1 including a processor calculating a dew point of air proximal said lens based upon said ambient air temperature sensed by said first temperature sensor, said temperature of said lens sensed by said second temperature sensor, and said moisture content sensed by said humidity sensor, wherein said exhaust directs gas at said lens when said dew point is greater than or equal to said temperature of said lens sensed by said second temperature sensor.

9. The vehicle as in claim 1, in which said temperature of said lens sensed by said second temperature sensor is a temperature of an exterior surface of said lens.

10. The vehicle as in claim 9, in which said exhaust directs gas at said exterior surface of said lens.

11. A method of removing and preventing lens surface moisture contamination from a lens of an optical device mounted on a frame of a vehicle, said method comprising;
sensing an ambient air temperature of ambient air surrounding a vehicle;
sensing a lens temperature of a lens of an optical device mounted on the vehicle and exposed to said ambient air surrounding said vehicle;
sensing moisture content of air proximal said lens; and directing moisture contamination removal gas at an exterior surface of said lens in response to said ambient air temperature, said lens temperature of said lens, and said moisture content of air proximal said lens.

12. The method as in claim 11, including heating said moisture contamination removal gas prior to directing the moisture contamination removal gas at said lens.

13. The method as in claim 11, including lowering moisture content in said moisture contamination removal gas below the moisture content of air proximal said lens.

14. The method as in claim 11, including urging said moisture contamination removal gas at said lens using a blower.

15. The method as in claim 14, including operating said blower at different speeds, wherein each speed causes a different amount of flow of said moisture contamination removal gas at said lens.

16. The method as in claim 11, including directing a steady stream of moisture contamination removal air at said lens.

17. The method as in claim 11, including directing pulses of moisture contamination removal air at said lens.

18. The method as in claim 11, including calculating a dew point of air proximal said lens based upon said ambient air temperature, said lens temperature of said lens, and said moisture content of air proximal the lens, and then directing said moisture contamination removal air through said air exhaust at said lens when said dew point is greater than or equal to said lens temperature of said lens.

19. The method as in claim 11, in which said lens temperature of said lens is a temperature of an exterior surface of said lens.

20. The method as in claim 19, in which said air exhaust directs moisture contamination removal gas at said exterior surface of said lens.

* * * * *